(12) United States Patent
Bauernschmid et al.

(10) Patent No.: US 8,405,893 B2
(45) Date of Patent: Mar. 26, 2013

(54) DEVICE FOR PRODUCING A HIGH-RESOLUTION REFLECTION HOLOGRAM

(75) Inventors: Peter Bauernschmid, Peiβenberg (DE); Gerhard Hochenbleicher, Fürstenfeldbruck (DE)

(73) Assignee: Prufbau Dr. Ing. H. Durner GmbH, Peibenberg (DE)

( * ) Notice: Subject to any disclaimer, the term of this patent is extended or adjusted under 35 U.S.C. 154(b) by 463 days.

(21) Appl. No.: 12/599,620

(22) PCT Filed: May 13, 2008

(86) PCT No.: PCT/DE2008/000780
§ 371 (c)(1),
(2), (4) Date: Nov. 10, 2009

(87) PCT Pub. No.: WO2008/138309
PCT Pub. Date: Nov. 20, 2008

(65) Prior Publication Data
US 2011/0069287 A1   Mar. 24, 2011

(30) Foreign Application Priority Data
May 11, 2007  (DE) .................... 10 2007 022 109

(51) Int. Cl.
*G03H 1/20* (2006.01)
*G03H 1/22* (2006.01)
*G02B 5/32* (2006.01)
*G03B 27/00* (2006.01)

(52) U.S. Cl. .................. 359/12; 359/15; 359/32; 355/2

(58) Field of Classification Search ................ 359/2, 12
See application file for complete search history.

(56) References Cited

U.S. PATENT DOCUMENTS

| | | | |
|---|---|---|---|
| 5,347,435 A * | 9/1994 | Smith et al. ............. | 362/503 |
| 7,548,360 B2 * | 6/2009 | Brotherton-Ratcliffe et al. ............. | 359/35 |
| 2001/0053004 A1 * | 12/2001 | Nishikawa et al. ............. | 359/15 |
| 2004/0136038 A1 * | 7/2004 | Holmes et al. ............. | 359/15 |
| 2005/0068596 A1 * | 3/2005 | Claudelli et al. ............. | 359/25 |

* cited by examiner

*Primary Examiner* — Jade R Chwasz
(74) *Attorney, Agent, or Firm* — Mannava & Kang, P.C.

(57) ABSTRACT

A device for producing a reflection hologram by means of a master, which is formed by a substrate on which a saw-toothed shaped structure is formed by molding, mechanical or lithographical methods. The structure has a reflective finish, such that the desired surface is produced on the structure. The light of a laser light source is expanded by means of an optical device, thus enabling a beam having a predetermined beam width to be obtained. The beam radiates the master and is reflected by the structure at an angle α in relation to the incident beam. Above the smooth surface arranged over the structure a photopolymer-film, containing a photo-sensitive layer that is disposed at a distance in relation to the structure, is arranged and the reflection hologram is produced in the photo-sensitive layer.

11 Claims, 8 Drawing Sheets

Fig. 1

R = d tanα

FIG. 7a two dimensional structures

FIG. 7b

FIG. 7c three dimensional structures

FIG. 7d vertical structure

FIG. 7e horizontal structure

⟶ incident rays

┄┄▶ reflected rays

◤┄┄◢ area of reflection

DEVICE FOR PRODUCING A HIGH-RESOLUTION REFLECTION HOLOGRAM

The present invention concerns a device for producing a reflection-hologram of high resolution according to the preamble of claim 1.

In order to produce a reflection-hologram, it is known to deposit on a master-hologram a photosensitive material, e. g. a photosensitive film, in such a manner, that light is directed onto said master-hologram and reflected in direction of said film, wherein said light is provided by a laser-lightsource and may be white light (R/G/B) as well as monochromatic light. Such a method and a device for carrying out said method is disclosed in document DE 10 2005 029 853 A1. The disclosed master-hologram is preferably of multi-layered structure. Separate colour-components of said light, obtained by separation via filters, are selectively reflected by separate layers. Production of such a complex multilayered master is costly as it has to provide single layers, that will have functions in relation to wavelength and recording—as well as reconstruction-angle, which are exactly coincident, in order to securely avoid colour-shift.

Furthermore it is a known possibility to produce an optically variable surface-pattern having at least one graphic design consisting of light and dark areas, if said areas of said design have a number of lines per millimeter of less than 250 and such a contour, that light areas of said graphic design will seem to be achromatic in a specific angle of inclination. Such a method of producing a respective pattern is disclosed in DE 696 07 857 T2. Furthermore it is known from EP 360 069 B1 to provide diffractive elements with surface-parts that will have a colour of high luminance. Said surface-parts comprise relief-structures—for providing a diffractive grating—of asymmetrical shape, e. g. saw-tooth-like shape. Said diffractive gratings reflect incident light mainly within first diffraction order. That is why said diffractive gratings change colour with changing angle of incidence or observance. The obtainable amount of asymmetry, i. e. the relation of intensity of light diffracted to the first order of diffraction, is typically 3:1 and at most 30:1.

For the production of reflection-holograms in the area of security-related applications, e. g. in the area of tamper-proof documents, admittance- or ID-tags and the like, ist is desirable to provide an individual reflection-hologram, which will contain for example a picture of the respective owner as well as codes and data. Said reflection-hologram may be applied in addition to measures like holograms, emblems, patterns and so forth.

The respective constellations of such measures known from the prior art are either insufficient or extremely difficult to produce and/or handle, if used in the area of security-related applications.

The object of the present invention is to provide a method of the predescribed type, which is applicable in the respective areas and allows easy practicability at reduced cost and allows the production of individualised holograms as well as individualised reflection-holograms. Said object is met with a device having the features according to claim 1. Advantageous features are given in the dependant claims.

An especially advantageous embodiment of the present invention for producing a reflection-hologram of high resolution in a photosensitive layer via a structured master has a laser-light source, which emits a group of rays onto a user-defined master, wherein the structure of said master is large in comparison to the wavelength of said light emitted by the laser-light source and wherein the structure of the master has a mirrored surface, the maximum resolution of the reflection-hologram to be produced being dependent on the distance between photosensitive layer and surface of said master as well as width of said group of rays of the laser-light-source and angle defined by master-incident group of rays and structure-reflected group of rays.

An especially advantageous device is characterised by the maximum resolution of the reflection-hologram being defined by the correlation of minimum width of ray equaling to the product of distance between photosensitive layer and surface of the master in combination with the tangent of angle (alpha) defined by master-incident group of rays and structure-reflected group of rays, which can be represented by the formula R=d tan (alpha).

Furthermore a device will be advantageous, if the structure of the master is produced according to in pinciple known shaping-, lithographic or mechanical methods.

Especially advantageous is a device, in which within the structure of a master one or more substructures are provideable, e. g. the structure being provided as a multi-dimensional pattern with differing optical properties on a body, e. g. a cylinder, as well as said structure comprising elements alike to concave mirrors and/or lense-like arrangements as well as said structure being arranged in such a manner, that specific selections of incedent rays are combined with specific structures, enabling a multi-dimensional reflexion-hologram to be produced.

An advantageous, inventive device is also obtained by adding a transparent filling-layer onto the structured side of the master, providing an even surface, and wherein on top of said filling-layer a diffusing screen-structure is provided.

An especially advantageous embodiment has filling-layers with different, wavelength-selective properties, being furthermore transparent or intransparent, and these filling-layers being user-defined in area and size as well as being one- or multilayer-structured and adaptable to the covering filters or absorbing layers.

An inventive device will be especially advantageous, if by each laser-light-source a reflection-hologram is obtainable an in general principle known contact printing method, wherein the photosensitive layer is provided preferably as a photopolymer-film, said photopolymer-film being arranged between the master's structure and the laser-light-source.

Furthermore a device will be advantageous, if said reflection hologram is obtainable via a multidimensionally movable structure, said movable structure being constructed as a multidimensionally movable exposure-unit having a ray-guiding element.

A device will be of additionally advantageous construction, if said reflection-hologram is obtained via a relatively movable unit between a photosensitive layer, e. g. a photopolymer-film, and said structure.

Furthermore it will be advantageous, if said reflection-hologram is obtained as a variable, multidimensional code or surface-pattern, said reflection-hologram serving for example as a scale, having a multitude of parallel or non-parallel arranged lines or refractive elements in varied resolution.

An inventive device will also be advantageous, if said device is movable relatively to the photosensitive layer, e. g. a photopolymer-film, or if said device has a directly or indirectly arrangeable unit for layer-application by rolling, whereby a variable pattern may be provided on top of the photosensitive layer, said pattern acting as a filter for the group of rays emitted by the laser-light-source. Said filter is especially obtainable by printing the surface of the photopolymer-film, e. g. by printing colours and/or optical filters onto said surface.

Within an embodiment it is also advantageous if said filter is provided as a unit variable in its transparency, e. g. as a controlled array or an LCD-unit.

Especially advantageous is the arrangement of a material on top of said photosensitive layer, that will provide a partial shadowing of said photosensitive material. By appropriate methods a material may be used comprising an individual perforation or mask-like structure.

Said material may be for example a laser-cut, non-transparent or wavelength-selective material, e. g. a plastic ribbon, that allows exposure or UV-exposure within the area of perforation as well as production of a hologram within the perforated areas, but will not change reactivity in the shadowed areas, i.e. keeping these shadowed areas unchanged, making the production of further user-defined holograms in said areas possible, wherein the arrangement of the inventive device is preferably in such a way, that each exposure will be effected to a different side of said film.

It is especially advantageous, if an inventive device has a laser-light-source being constructed as a white light (R/G/B)-laser or as a monochromatic laser.

The following embodiments shall demonstrate the advantages and properties of the present invention in more detail.

The figures exemplify . . .

FIG. 2a, 2b, 2c, 2d illustrate each arrangements of differently transparent and non-transparent interacting layers and filters;

Figure 1:
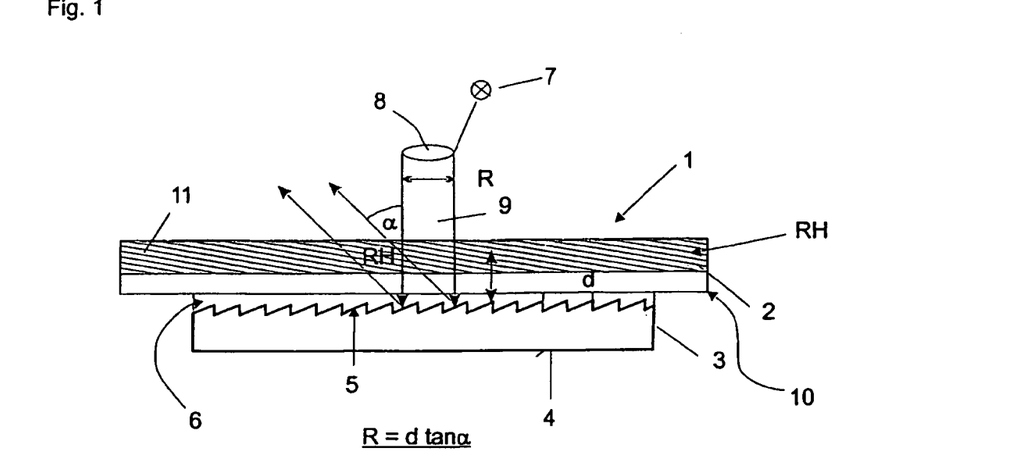
FIG. 1 a schematic illustration of the general principle of a device for producing a reflection hologram.

FIG. 1 exemplifies in a schematic illustration the principle of a device 1 for production of a reflection-hologram RH, having a master 3, said master being provided via a substrate 4, onto which a saw-tooth-like structure 5 has been generated via mechanical or lithographic methods or moulding methods. The generation of the structure 5 my be carried out according to known principles, but is characterised by the fact, that structure-features are large in relation to the wave-length of the light used for the production of the reflection-hologram. While doing so the structure-features are of completely selectable nature and should not be considered restricted to the saw-tooth-structures or plain structures depicted for exemplification, which will also be explained in more detail later on. Structure 5 is produced as a mirrored structure or will be mirrored subsequently and in the next step a transparent or partially transparent layer 6 is attached to structure 5 in such a way, that a smooth or partially smooth surface is obtained above structure 5 as needed.

The light of a laser-light-source 7 is guided via an optical means, e. g. a lense 8, providing a group of rays 9 with a predefined width R. The laser-light-source may be switched on and off at any time as needed. The group of rays 9 illuminates the master 3 and is reflected at the mirroring structure 5 at an angle alpha in relation to the incident group of rays 9.

A photopolymer-film 11 is arranged above the surface of the structure 5, said photopolymer-film having at a distance d to the structure 5 a photosensitive layer 2, in which the reflection-hologram RH will be produced. The structure 5 may be arranged along the bottom or surface of said photopolymer-film. If this arrangement is exposed to the group of rays 9 of the laser-light-source 7, the incident group of rays will interfere with the reflected group of rays within the photosensitive layer 2 and create a reflection-hologram, which will obtain the function of the structure 5 of the master 3. In the present example of a saw-tooth-like structure 5 a so-called holographic mirror will be obtained, which will deflect vertically incident light at a specific angle.

Figure 2:
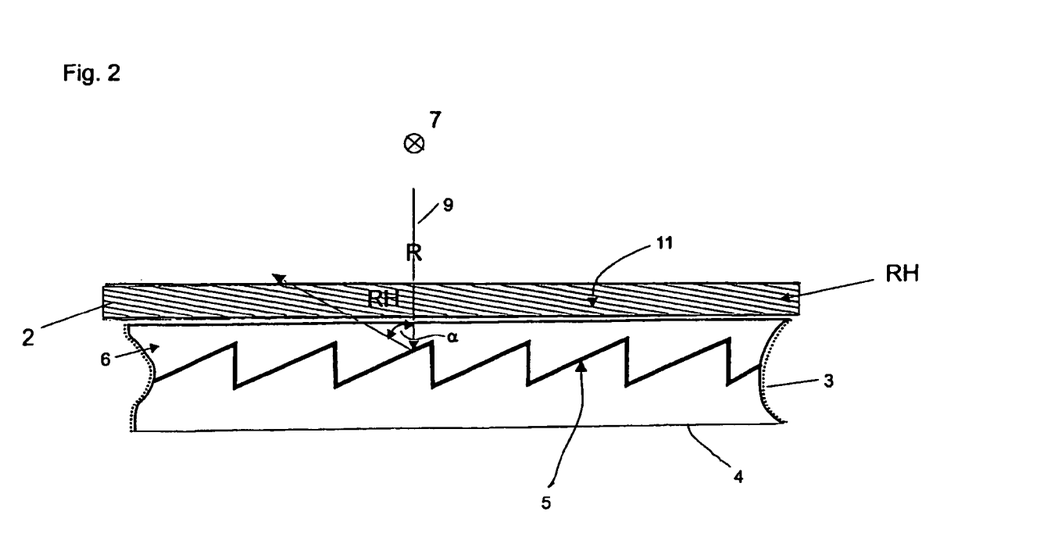
FIG. 2 a detailed illustration of a part of FIG. 1.

In FIG. 2 details of an arrangement according to FIG. 1 are depicted in larger scale in more detail. Said master 3 has a mirrored structure 5 on a substrate 4, said structure 5 being moulded as a sequence of saw-teeth. The structure 5 has been filled up with a layer 6, said layer being transparent in this example, providing a smooth surface on top of said master. Layer and surface may be shaped as exemplified in FIGS. 2a and 2b. An incident group of rays 9 is reflected at the mirrored structure 5 and will interfere within the photosensitive layer 2 by interaction of incident group of rays 9 and reflected group of rays.

If the resolution of the structure 5 is large in relation to the wave-length of the laser-light 9 used for exposure—meaning larger than 30 micrometers—the selected structure 5 is completely achromatic, i. e. with each available laser-light-source 7 a structural function may be copied into said photosensitive film 11. A thus-structured master 3 is a downright perfect master in comparison to the commonly applied holographic masters according to the prior art, which are inferiorly provided as either surface-gratings or volume-holograms.

Within the circumstances as they are depicted in FIG. 1, the distance d between the surface of structure 5 and the photosensitive layer 11 may be very small, resulting in a very high resolution of the reflection-hologram, i. e. the minimum size of picture elements i. e. pixels, can be further reduced. The minimal width of the exposing path of rays, i. e. of the group of rays 9, which corresponds to the minimum size of structure-elements, is defined by the requirement of interference of incident and reflected rays within the area of the photosensitive layer 2 in order to provide the corespondent, reflective structure within said layer. Thus the minimum pixel-size can be derived from the distance d between the structure 5 and the photosensitive layer 2 as well as the angle alpha, defined by the incident group of rays 9 and the reflected group of rays. The correlation of these elements is given by the formula R=d tan (alpha), wherein "R" designates the minimum width of the group of rays 9, "d" designates the distance between the structure 5 and the photosensitive layer 2, which will be multiplied with the tangent of the angle alpha, said angle being defined by the incident group of rays 9 and the reflected group of rays.

In FIG. 2a detailed view of the arrangement according to FIG. 1 is depicted at larger scale. The photosensitive layer covers a transparent material 13. Onto said material a filter has been applied, e. g. by a printing method. Said filter is wavelength-selective, ensuring an exposure only to be effective at a specific wavelength or by illumination with white laser-light, which will pass said filter only according to its selective function.

In FIG. 2b a material, being partially transparent as well as partially having applied filters, which may be exchanged by an automatic changing-device (not depicted), is arranged above the photosensitive layer 2. On said material a transparent area 14—for example obtained by screen printing—as well as wavelength-selective filters 16 are arranged. This results in the recognisable, defined areas of different properties during exposure, which will expose areas of the photosensitive layer selectively according to wavelength and transparency and which provide the possibility to produce a multitude of reflection-holograms RH within the photosensitive layer by interaction of a multitude of arrangements of areas as well as filters and layers of non-transparent materials. Non-exposed areas may be subject to exposure later on.

FIG. 2c shows a schematic representation of an arrangement of a filling layer, produced partially as a filter 21 and produced furthermore partially as a non-transparent area 14, which is arranged above the structure 5, providing a 'functional layer', which may also be used for encoding structures. Above said filling layer a photosensitive layer 2 is arranged, above which a transparent material 13, e. g. a thin sheet having filtering areas 16.2, is arranged, followed by another transparent material 19 having a perforation 18, integrated filters 16.1 as well as stacked filters 16.

The arrangement depicted in FIG. 2d shows a non-transparent material 22, having an indivivalised perforation/mask 18 for producing a reflection hologram at the areas 18.1 above a structure 5 as well as a wavelength-selective material 22 having a perforation 18 for producing a reflection-hologram RH at the area 18.1, while also producing a reflection-hologram with appropriate laser-light-wavelength beneath the wavelength-selective material 22. Within the material optically effective means, i. e. a moulded lense, may be contained.

Figure 3:
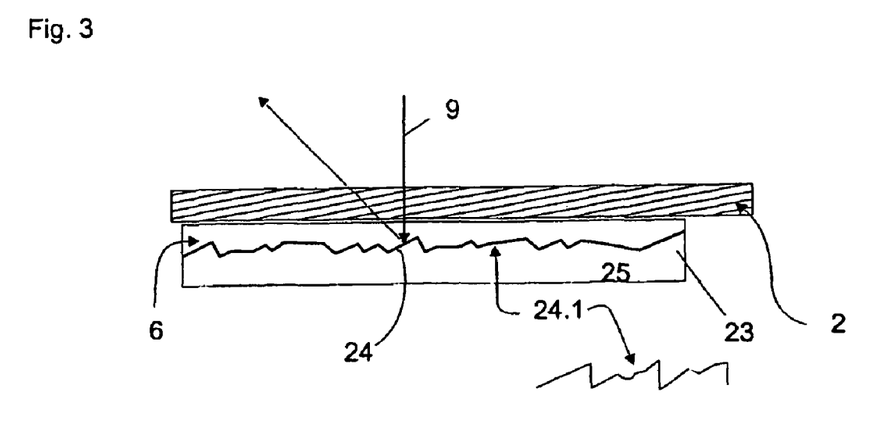
FIG. 3 a detail of an arrangement following the principle of FIG. 1, but having a master with a superimposed structure.

FIG. 3 depicts an advantageous detail within an arrangement according to FIG. 1 at larger scale, having a master 23 with additionally integrated structures 24, 24.1, that have been arranged on a substrate 25. A filling-layer 6 covers said structure, providing a smooth surface, which seals the master in direction to the non-depicted laser-light-source. A group of rays 9 of said laser-light-source is emitted onto said structure 24, 24.1, is reflected and interferes with the incident group of rays within the photosensitive layer arranged above said structures 24, 24.1 in the predescribed manner.

Deviating from FIGS. 1 and 2, the depicted structures 24, 24.1 of the arrangement 5 exemplify, that user-defined structures may be applied within inventive devices. The exemplifying structure 24, 24.1 shows super-imposed saw-tooth-like structures with level areas, said areas being parallel to the photosensitive layer 2, as well as more or less symmetrical parts of a serratedly molded surface. As FIG. 7 shows, further structures, being of different than two-dimensional definition, may be advantageously superimposed.

Figure 4:
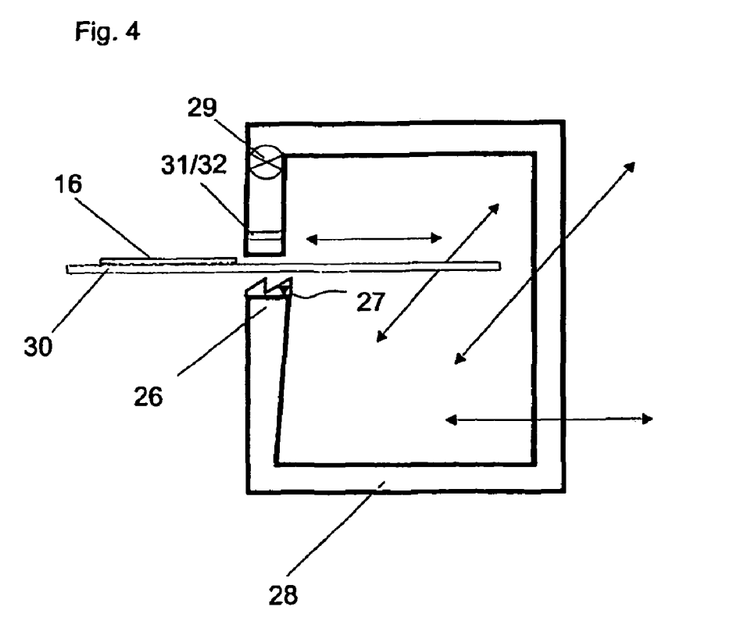
FIG. 4 a device with a multidimensionally movable structure-generating unit and exposure-unit in side-view.

An especially advantageous embodiment is depicted schematically in FIG. 4. Said figure shows a device, having a master 26, which has been reduced to a single, structural element 27. Said master 26 is attached to a controllable unit 28, which is movable in several, spatial directions. Unit 28 has a laser-light-source 29 as illumination-means, which is arranged opposite to the structural element 27 and is likewise movable together with said structural element 27. Between the laser-light-source 29 and the structural element 27 of the master 26 there is arranged a photopolymer-film 30, in which the reflection-hologram is to be created. Thus, the unit 28 is movable together with the laser-light-source 29 and the master 26, in relation to the photopolymer-film 30; whether unit 28—as predescribed—or photopolymer-film 30 is actually actively moved is of no relevance. The relevant feature in this embodiment is, that the reflection-hologram is written according to the already prediscribed principle equivalent to the conact printing technique, but the details—i. e. the 'writing'—is effected by the relative movement between photopolymer-film 30 and unit 28. This method allows the creation of user-defined patterns within the photopolymer-film 30 or for example the selective exposure of small areas on a carrier-strip. Thus the dimensions of the photopolymer-film or of the photosensitive layer, deposited on a carrier, is no longer restricting. The relative movement of photopolymer-film 30 and unit 28 may be controlled by a numerical control-device, in which the data for generation of a user-defined pattern is stored.

Furthermore, an exposure mask may be provided by an LCD-element 31 or array 32, arranged between laser-light-source 29 and photopolymer-film 30 within the device 20. Such arrays 32 or LCD-elements 31 are advantageous, because they can be controlled user-defined, making the generation of user-defined patterns possible. Especially advantageous a master consists of a single, structural element of minute size, making the selected, discrete exposure of extremely small areas possible.

Figure 4A:
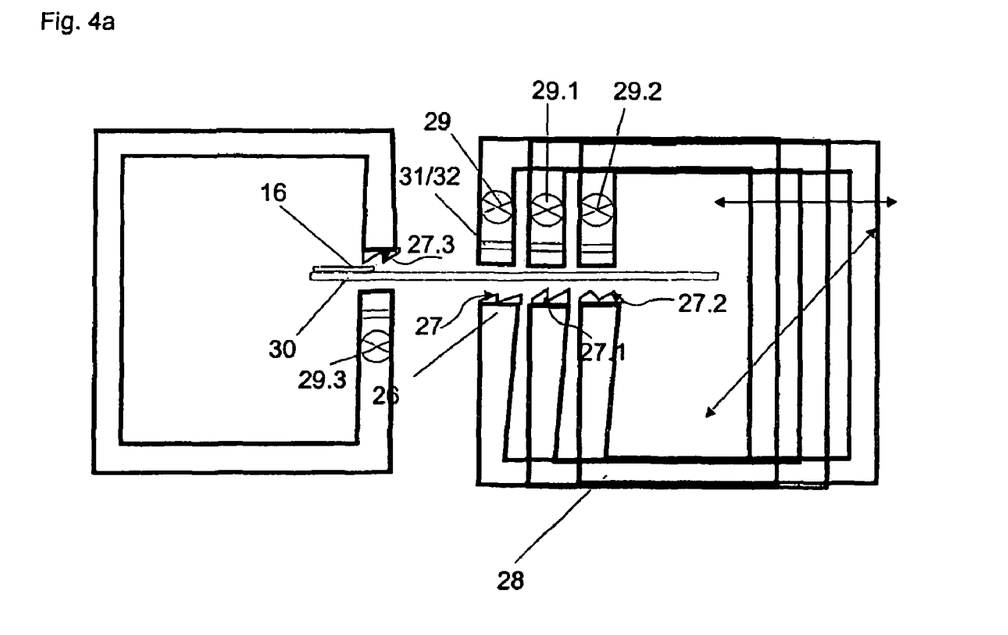

FIG. 4a exemplifies an advantageous embodiment according to FIG. 4, having several processing units in subsequent arrangement, wherein the position of each is freely selectable via a non-depicted control-unit, and wherein furthermore each unit may be equipped with differently selectable, structural elements 27, 27.1, 27.2, 27.3 and wherein each unit may be equipped with differently selectable laser-light-sources 29, 29.1, 29.2, 29.3—e. g. white light or a color in RGB. Such an arrangement allows the production of advantageous individual reflection-holograms of differing properties.

Figure 4B:
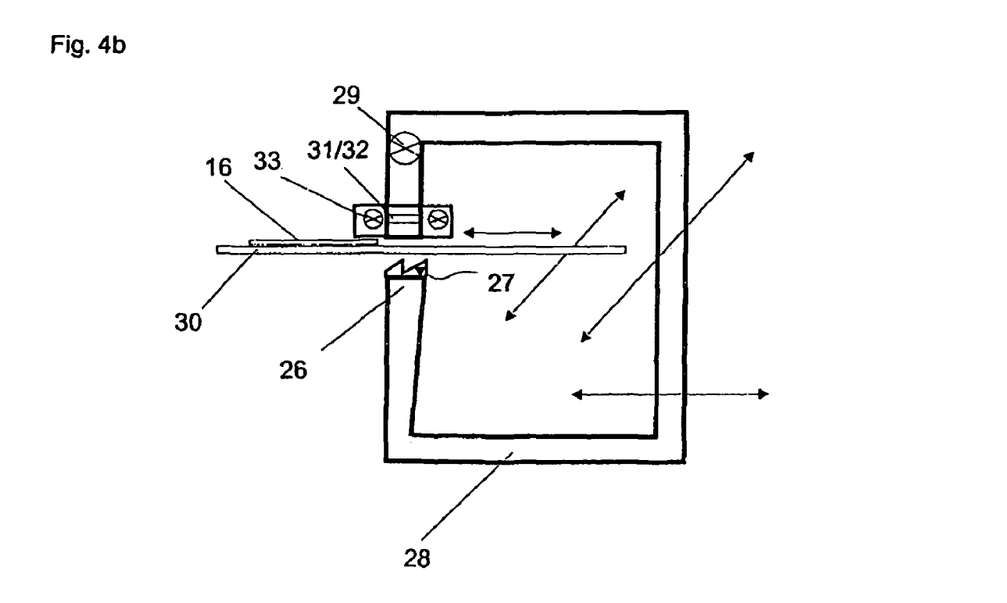

FIG. 4b schematically exemplifies an advantageous embodiment according to FIGS. 4 and 4a, having a laser-light-source and an additional light-source, e. g. an U.V.-lightsource. Said U.V.-lightsource may selectively destroy the reactivity of the photopolymer, rendering the respectively exposed area inactive, so that no further reflection-hologram may be produced within said area. The combination with a device for producing reflective-holograms is especially advantageous, if customised patterns have to be produced.

Figures 5, 6:
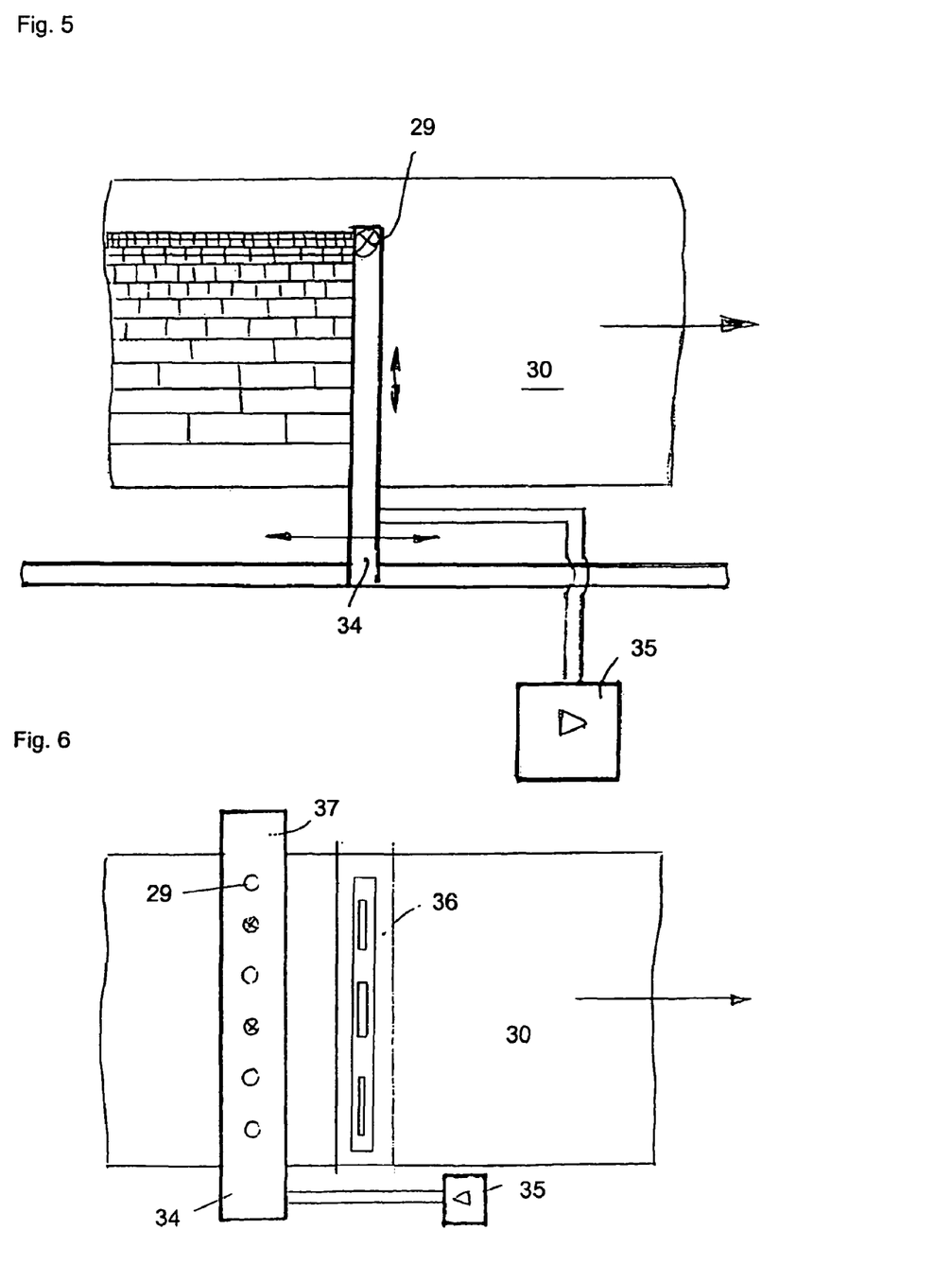
FIG. 5 a device with multidimensionally movable structure-generating unit in top-view.
FIG. 6 a unit for generating a variable pattern, said unit being movable relatively to said photopolymer-film.

FIG. 5 schematically exemplifies in top-view a section of an arrangement alike to the one depicted in FIG. 4. As can be seen, the depicted principle provides devices capable of producing structures as well as reflection-holograms, which will be usable as gauge, even providing several resolutions. Such a gauge can be used as incremental or coded gauge, which allows incremental as well as absolute measurement of dimensions via said reflection-holograms.

Within the exemplified embodiment, components of similar function have been assigned the same designation for clarification. In addition to the components described and shown in FIG. 4, a control unit 35 is depicted. The arrows are indicating the possible, relative movement between the respective parts.

A further embodiment is exemplified schemtically in FIG. 6. Alike to the device shown in FIG. 4 an exposure-unit, consisting of a laser-light-source, a ray-guiding element and an optical control—e. g. a cylinder lense 37—is arranged above a photopolymer-film 30. Below said photopolymer-film 30 there is arranged a non-depicted structure according to the invention. Furthermore, a printing-means 36 extends sidewise along the surface of the photopolymer-film. Said printing-means 36 is controlled by a controlling unit 35, providing the selective, liquid application of colours and/or optical filter-materials onto the surface of said photopolymer-film 30. Thus, a user-defined mask can be provided, by which in combination with the exposure-unit and the structure, a desired reflection-hologram can be produced as described in the explanation relating to FIG. 4.

FIG. 7 shows various examples of structures, as they may find application within the scope of this invention. The depicted structures show the versatility in selectable structures and should not be deemed as restricting the present application to said advantageous embodiments.

Figure 7A:
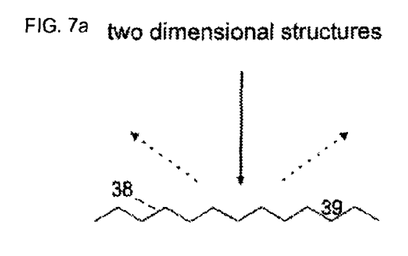
FIGS. 7a to 7g various surface-elements.

FIG. 7a shows a structure 38, which has even, reflective surfaces.

Figure 7B:
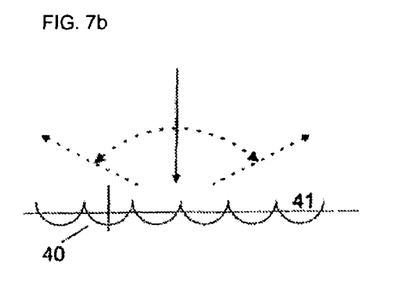
Figure 7C:
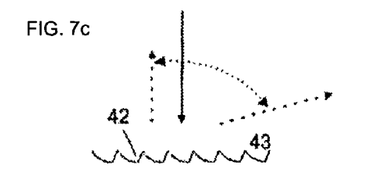
Figure 7D:
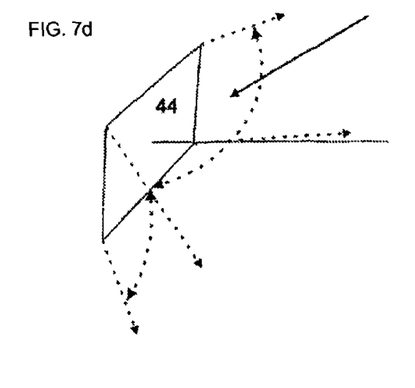
Figure 7E:
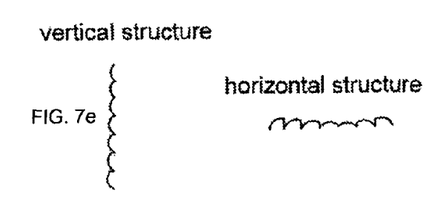
Figure 7F:
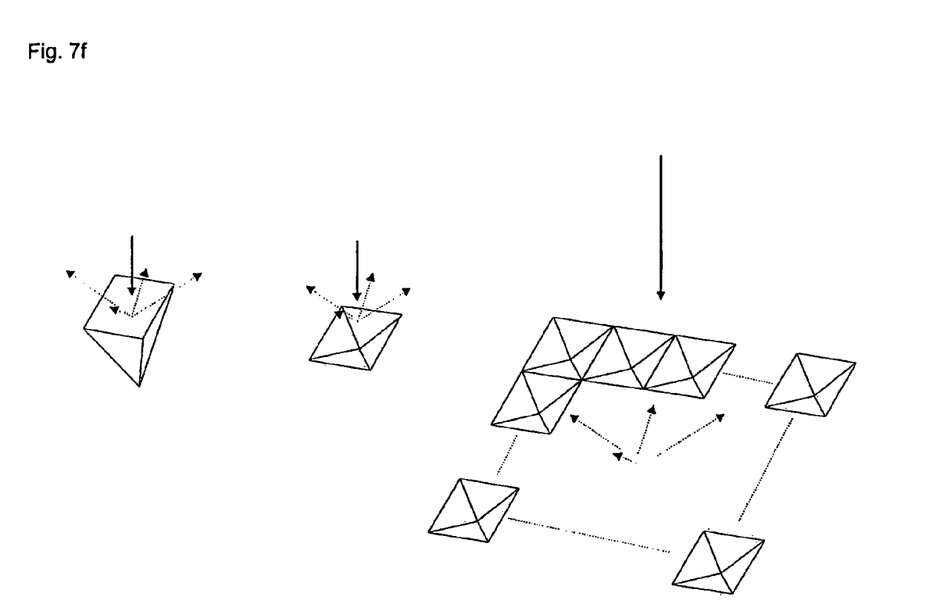
Figure 7G:
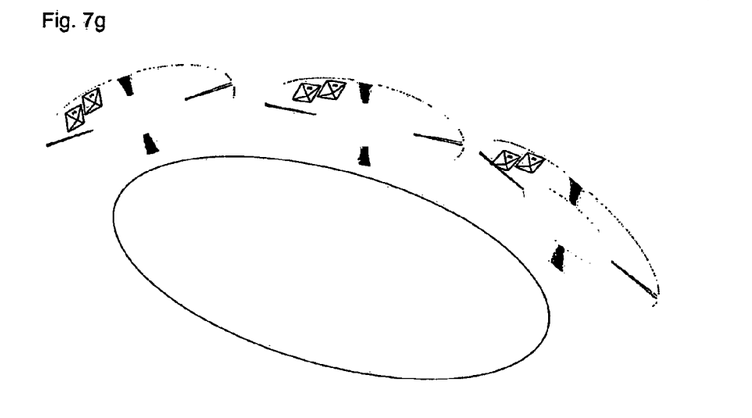

FIG. 7b shows a structure 40, having spherical as well as concave, mirror-like reflection-surfaces, which will provide a cone-like reflection of incident group of rays.

Furthermore combined structures 42 of varied surfaces may be applied. In addition to these two-dimensionally defined structures, spatial structures may be applied, as schematically exemplified in FIGS. 7d to 7g.

FIGS. 7d to 7g show in simplified principle, that an incident ray of light, being projected onto structure 44 from a specific direction, will be reflected to a specific, predetermined direction, enabling control of structure by shape, arrangement and single element within the spatial arrangement of elements.

Designations
R=width of group of rays
d=distance between structure and photosensitive layer
RH=reflection-hologram
KRH=no reflection-hologram
W=automated transporting-means
T=groove; substructure within a surface
1 device
2 photosensitive layer
3 master
4 substrate
5 structure
6 at least partially transparent filling-layer for providing a smooth surface
7 laser-light-source
8 optical control; lense
8.1 optically effective element
9 group of rays
10 photopolymer-film
11 photosensitive layer
12 non-exposed area of the photosensitive layer
13 transparent material; carrier
14 non-transparent layer or material
15 non-transparent layer
16 filter; absorbing layer
16.1 integrated filter
17 integrated filter
18 perforation; cut-out
19 non-transparent material
20 transparent material
21 filter; wavelength-selective filling-layer
22 wavelength-selective master
23 master
24 structure
24.1 structure/superimposed structure
25 substrate
26 master
27 structure; structural element
27.1 structure; structural element
27.2 structure; structural element
27.3 structure; structural element
28 controllable unit
29 laser-light-source
29.1 laser-light-source
29.2 laser-light-source
29.3 laser-light-source
30 photopolymer-film
31 LCD-element
32 Array, controllable, DMD
33 UV-lightsource
34 carrier
35 control-unit
36 printing-means
37 exposure-unit
38 structure
39 even, reflective surfaces
40 structure
41 spherical reflection-surfaces
42 structure
43 different reflective surfaces
44 spatial structure

The invention claimed is:

1. A device for producing at least one reflection-hologram of high resolution within a photosensitive layer to be implemented in security-related applications, said device comprising:
a structured, holographic master, wherein the holographic master comprises structures including a plurality of peaks and valleys formed on a surface of the holographic master;
a filling-layer positioned in contact with the surface of the holographic master, wherein the filling-layer is at least partially transparent, wherein a first side of the filling-layer fills the valleys formed in the surface of the holographic master and a second side of the filling-layer, opposite the first side, is substantially flat, and wherein the photosensitive layer is to be positioned in contact with the second side of the filling-layer;
a laser-light-source, which emits a group of rays onto the structured, holographic master; and
an ultraviolet (UV) light-source, which emits UV light to selectively destroy reactivity of the photosensitive layer so that no further reflection-hologram is able to be produced in areas of the photosensitive layer in which reactivity has been destroyed to thereby produce customized patterns on the photosensitive layer, wherein a resolution of the structure of said master is large in relation to the wavelength of light emitted by the laser-light-source, the structure of said master is reflectingly mirrored, a maximum resolution of said reflection-hologram (RH) depends on the distance (d) between a photosensitive layer and the surface of the master, as well as the width (R) of the group of rays of the laser-light-source and on an angle α defined by the group of rays reflected at said structure as well as the group of rays emitted onto said master, wherein the resolution of the structure with more than 30 micrometers is large in relation to the wavelength of the laser-light used for exposure and wherein the structure is completely achromatic in relation to the laser-light.

2. The device according to claim 1, wherein the maximum resolution being derivable from a minimum width of group of rays (R), which equals to the product of distance between the photosensitive layer and the surface of the master and tangent of said angle α, wherein α is defined by the group of rays reflected at said structure as well as the group of rays emitted onto said master according to the equation:

$$R=d\tan(\alpha).$$

3. The device according to claim 1, wherein the structure and/or at least one substructure of the master is prepared by a molding technique, lithographic technique or mechanical technique.

4. The device according to claim 1, wherein the structure is formed as a multidimensional pattern with differing optical properties, comprising at least one element, having an arrangement selected from the group consisting of concave, mirrored arrangements, lense arrangements, variable surface-patterns, a gauge having several parallel lines at differing angles and resolutions.

5. The device according to claim 4, wherein said pattern is provided via at least one of filters, adjustable filters and a light-blocking, non-transparent material, wherein said at least one of filters and materials are obtainable by direct or indirect printing or coating of surfaces of the photopolymer-film and/or via colours, emulsions and/or optical filters and are positionable via further materials.

6. The device according to claim 1, wherein the surface of the filling-layer has at least one optically effective element, said at least one optically effective element having at least partially features of elements selected from the group consisting of a diffusive screen structure, a partial groove or a substructure (T).

7. The device according to claim 1, wherein said device has at least one laser-light-source, which is arranged to produce a reflection-hologram (RH) via a contact printing method.

8. The device according to claim 1, wherein the photosensitive layer is provided as a photopolymer-film, which is arranged between the structure of the master and the laser-light-source.

9. The device according to claim 1, wherein the reflection-hologram (RH) is obtainable via a multidimensionally movable structure-generating unit.

10. The device according to claim 1, wherein the device has at least one controllable array for adjusting local transparency above the photosensitive layer.

11. The device according to claim 10, wherein the array is an adjustable LCD-element.

* * * * *